US007908866B2

(12) United States Patent
Kato et al.

(10) Patent No.: US 7,908,866 B2
(45) Date of Patent: Mar. 22, 2011

(54) GAS TURBINE COMBUSTOR

(75) Inventors: Eigo Kato, Hyogo (JP); Mitsuru Kondo, Hyogo (JP); Tatsuo Ishiguro, Hyogo (JP); Masaki Ono, Hyogo (JP); Tetsu Konishi, Hyogo (JP); Tetsuya Iwamoto, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 774 days.

(21) Appl. No.: 11/660,268

(22) PCT Filed: Mar. 17, 2006

(86) PCT No.: PCT/JP2006/005449

§ 371 (c)(1), (2), (4) Date: Apr. 2, 2007

(87) PCT Pub. No.: WO2006/109431

PCT Pub. Date: Oct. 19, 2006

(65) Prior Publication Data

US 2008/0010989 A1 Jan. 17, 2008

(30) Foreign Application Priority Data

Apr. 1, 2005 (JP) ................................ 2005-106811

(51) Int. Cl.
*F02C 1/00* (2006.01)
*F02G 3/00* (2006.01)

(52) U.S. Cl. ........................................... 60/752; 60/800

(58) Field of Classification Search ............ 60/796–800, 60/752–760

See application file for complete search history.

(56) References Cited

U.S. PATENT DOCUMENTS

| | | | | |
|---|---|---|---|---|
| 3,841,718 | A * | 10/1974 | Reinsma | 305/103 |
| 4,195,474 | A * | 4/1980 | Bintz et al. | 60/730 |
| 5,400,586 | A * | 3/1995 | Bagepalli et al. | 60/800 |
| 6,662,568 | B2 | 12/2003 | Shimizu et al. | |
| 6,751,962 | B1 * | 6/2004 | Kuwabara et al. | 60/800 |
| 6,792,763 | B2 * | 9/2004 | Sileo et al. | 60/796 |
| 6,834,507 | B2 * | 12/2004 | Jorgensen | 60/800 |
| 6,860,108 | B2 * | 3/2005 | Soechting et al. | 60/752 |
| 7,178,340 | B2 * | 2/2007 | Jorgensen | 60/800 |
| 7,481,037 | B2 * | 1/2009 | Takaya et al. | 60/39.37 |
| 7,527,469 | B2 * | 5/2009 | Zborovsky et al. | 415/9 |
| 7,584,620 | B2 * | 9/2009 | Weaver et al. | 60/796 |
| 2004/0031270 | A1 * | 2/2004 | Sileo et al. | 60/796 |
| 2004/0031271 | A1 * | 2/2004 | Jorgensen | 60/796 |

(Continued)

FOREIGN PATENT DOCUMENTS

JP S58-31226 2/1983

(Continued)

*Primary Examiner* — William H Rodríguez
(74) *Attorney, Agent, or Firm* — Manabu Kanesaka; Benjamin Hauptman; Kenneth Barner

(57) ABSTRACT

An object of the present invention is to provide a gas turbine combustor with improved fatigue resistance of a combustor. It is possible to intentionally reduce a stiffness of each of flanges of upper and lower walls of an end portion (outlet) of the tail pipe of the gas turbine combustor. It is possible to reduce a stiff difference between the upper and lower walls of the end portion (outlet) of the tail pipe section and side walls. Thus, it is possible to reduce compulsion deformation caused due to thermal stress generated in the end portion (outlet) of the tail pipe section on the operation of the conventional gas turbine combustor, and to reduce high stress easy to generate in the side plate. As a result, the gas turbine combustor with high fatigue resistance can be realized.

7 Claims, 10 Drawing Sheets

U.S. PATENT DOCUMENTS

| | | | | |
|---|---|---|---|---|
| 2005/0063816 | A1* | 3/2005 | Jorgensen | 415/110 |
| 2006/0288707 | A1* | 12/2006 | Weaver et al. | 60/796 |
| 2008/0236170 | A1* | 10/2008 | Weaver et al. | 60/800 |

FOREIGN PATENT DOCUMENTS

| | | |
|---|---|---|
| JP | H07-259509 | 10/1995 |
| JP | 2001-349544 | 12/2001 |
| JP | 2003-185140 | 7/2003 |
| JP | 2003-193866 | 7/2003 |
| JP | 2003-314980 | 11/2003 |
| JP | 2003-322337 | 11/2003 |
| JP | 2004-084601 | 3/2004 |

* cited by examiner

DEFORMATION ON OPERATION

GAS TURBINE COMBUSTOR

TECHNICAL FIELD

The present invention relates to a gas turbine combustor.

BACKGROUND ART

FIG. 1A is a diagram schematically showing the structure of a tail pipe section of a conventional combustor seen from an exhaust side of burning gas. Also, FIG. 1B is sectional views showing sections of the tail pipe section of the conventional combustor along the lines A-A and B-B shown in FIG. 1A. As shown in FIG. 1A, when a plurality of combustors are annularly provided with around one axis, an upper flange 1*a* and a lower flange 1*b* are provided for an end portion of a main body 3 of the tail pipe section to fix an upper seal section 10*a* and a lower seal section 10*b* so that the burning gas can be prevented from leaking from a gap between adjacent tail pipes. Also, a gusset 4 is provided for an upper portion of the main body 3 of the tail pipe section to fix the main body 3 of the tail pipe on the housing of the gas turbine. Also, side seals 2*a* and 2*b* are provided for the side walls of the main body 3 of the combustor tail pipe section to function as a partition of the adjacent combustors. As shown in FIG. 1B, the upper seal section 10*a* and the lower seal section 10*b* are engaged with the upper flange 1*a* and the lower flange 1*b* in the main body 3 of the combustor tail pipe section, respectively. A positioning pin 5*a* is inserted in an engaging portion of the upper flange 1*a* of the main body 3 of the combustor tail pipe section and the upper seal section 10*a* to fix a relative position of them. In the same way, a positioning pin 5*b* is inserted in an engaging portion of the lower flange 1*b* of the main body 3 of the combustor tail pipe section and the lower seal section 10*b* to fix a relative position of them. In this way, the seal sections 10*a* and 10*b* are connected with the end portion of the main body 3 of the tail pipe section and the leakage of burning gas from the gaps between the end portion of the main body 3 of the combustor tail pipe section and the seal sections is prevented.

In the conventional gas turbine combustor, there is a case that defects such as thermal deformation is caused due to low cycle fatigue in the end portion (outlet) of the combustor tail pipe section during a burning operation. Since the thicknesses of structural plates are different between the side walls and the upper and lower walls in the end portion of the combustor tail pipe section so that the stiffness of the plate in the upper and lower walls thicker than the side walls is high, the low cycle fatigue is caused when thermal stress is impressed on the end portion of the combustor tail pipe section so that compulsory thermal deformation is caused in a plate of the side wall while a start and a stop of the operation of the gas turbine combustor are repeated. Therefore, while the gas turbine combustor repeats the start and the stop, the metal fatigue due to the thermal deformation is accumulated and a warp is generated in the plate of the side wall to form crack.

FIG. 2 is a diagram showing deformation of the side, upper and lower plates of the end portion of the tail pipe section in the operation of the conventional gas turbine combustor as a specific instance. A temperature is high on the side of inner wall and is low on the side of the outer wall, of the end portion of the tail pipe through which the burning gas passes in the operation of the gas turbine. Therefore, the side, upper and lower plates of the end portion of the tail pipe section are likely to be deformed to be convex in an inner direction. However, the stiffness of the upper flange 1*a* and lower flange 1*b* is remarkably high compared with that of side plates of the side walls 2*a* and 2*b*. Thus, the side plates in the end portion of the tail pipe section are compulsorily deformed in a direction opposite to a direction of original deformation. Therefore, while strong thermal stress generated in the side plates in the end portion of the tail pipe section, and the metal fatigue is accumulated in the side plates in the end portion of the tail pipe section while the gas turbine combustor repeats the start and the stop. Thus, the defect which is based on the metal fatigue in the side wall is caused.

In conjunction with "Combustor and Gas Turbine" is disclosed in the Japanese Laid Open Patent Application (JP-P2004-84601A). In this conventional example, air compressed by a compressor and fuel are mixed and burned. Generated burning gas is introduced into a turbine through a burning pipe. In such a combustor, an air flow path is provided to extend along a surface of a sidewall section in the sidewall section for the burning pipe. An inlet of the air flow path is provided on a surface of the outer wall of the sidewall section. An outlet of the air flow path is provided for an end surface of the burning pipe.

Also, "Combustor and Gas Turbine" is disclosed in Japanese Laid Open Patent Application (JP-P2003-322337A). In this conventional example, air compressed by a compressor and fuel are mixed and burned. Generated burning gas is introduced into a turbine through a burning pipe. In such a combustor, reinforcement ribs are provided over whole width of a side surface of the burning pipe of an almost rectangular section.

Also, "Gas Turbine Combustor" is disclosed in Japanese Laid Open Patent Application (JP-P2003-193866A). In this conventional example, adjacent transition pieces (tail pipes) in neighborhood of the gas turbine combustor, and a transition piece and an initial stage still wing are engaged through the seal section. In such a gas turbine combustor, a seal section is made of cobalt alloy having a fatigue resistance coating layer, in which a film of carbide or nitride is formed as a lower layer and an alumina film is used as the uppermost surface film. A protection plate of cobalt alloy which contains chrome 15 to 35 weight % and carbon 0.7 to 1.5 weight % for a contact section of the transition piece with the seal section in the engaging portion.

Also, "Gas Turbine Combustor" is disclosed in Japanese Laid Open Patent Application (JP-P2003-185140A). In this conventional example, a combustor transition piece (tail pipe) and an initial stage stillness wing in the gas turbine for power generation are engaged through a seal section. In such a gas turbine combustor, cobalt alloy which contains chrome of 15 to 30 weight % and carbon of 0.05 to 0.25 weight % as a part of the chemical composition is used as a base member. A plate to which a coating of chrome carbide of 0.1 to 0.6 mm as a main component is carried out is used as a seal section. A cobalt alloy plate is attached to a contact section of the seal section with coating layer in the transition engaging portion.

DISCLOSURE OF INVENTION

An object of the present invention is to provide a gas turbine combustor in which it is possible to intentionally reduce the stiffness of flanges provided for upper and lower walls in a tail pipe section of the gas turbine combustor.

Another object of the present invention is to provide a gas turbine combustor in which deformation in an end portion of a tail pipe section can be suppressed and high stress generated in a side plate can be suppressed.

Another object of the present invention is to provide a gas turbine combustor in which fatigue resistance of the combustor is improved.

A gas turbine combustor of the present invention includes a combustor main body; a tail pipe connected with the combustor main body to spout out burning gas; and a seal section provided to prevent the burning gas from leaking from a space of a plurality of the tail pipes annularly arranged around one axis. The tail pipe has upper and lower walls opposite to each other in a radius direction of the axis in an end portion of the tail pipe, and a first engaging portion is provided for the upper and lower walls. The seal section has a second engaging portion for engagement with the first engaging portion in a front end of the seal section. The first engaging portion is provided to reduce stiffness of the upper and lower walls.

In the gas turbine combustor of the present invention, the tail pipe further includes side walls opposite to each other in a circumferential direction of the axis in the end portion of the tail pipe. The first engaging portion has a structure to reduce a stiffness of the upper and lower walls so as to be substantially equal to a stiffness of the side walls.

Also, in the gas turbine combustor of the present invention, the first engaging portion includes one set of flanges opposite to each other in the radius direction. In this case, the gas turbine combustor of the present invention may further include a shield plate provided along each of the flanges of the one set. The shield plate and the flange may be fixed by a shield plate fixing member, and the tail pipe and the seal section may be connected, by engaging each of the flanges of the one set in which the shield plate is provided, with the second engaging portion.

Also, in the gas turbine combustor of the present invention, the first engaging portion may include one set of flanges provided to oppose to each other in the radius direction and to extend in a flow direction of the burning gas. Each of the flanges and the second engaging portion may be engaged with each other in the flow direction of the burning gas. In this case, each of the flanges may have a convex section, and the second engaging portion may have a concave section which is engaged with the convex section to connect the tail pipe and the seal section.

Also, in the gas turbine combustor of the present invention, the tail pipe may further include a gusset provided on a position apart from the end portion of the tail pipe to extend in a perpendicular direction to a pipe surface of the tail pipe and to fix the tail pipe to a housing of the gas turbine. The gusset may have a first supporting section to engage the second engaging portion, the tail pipe may have a second supporting section provided on the pipe surface of the tail pipe opposite to the gusset to engage the second engaging portion. The tail pipe and the seal section may be connected by engaging the first and second supporting sections as the first engaging portion and the second engaging portion.

Also, in the gas turbine combustor of the present invention, the first engaging portion may include the one set of the flanges opposite to each other in the radius direction, and each of the flanges may have an opening. In this case, a seal plate may be provided along an external circumference of the opening. The external circumference and the seal plate may be welded, and the tail pipe and the seal section may be connected by engaging the one set of the flanges and the seal plate connected to the set and the second engaging portion.

Also, in the gas turbine combustor of the present invention, the first engaging portion may include one set of flanges opposite to each other in the circumferential direction, and each of the flanges may have a slit extending in a direction perpendicular to the flow direction of the burning gas.

A gas turbine of the present invention may include the gas turbine combustor according to any of the above.

BEST MODE FOR CARRYING OUT THE INVENTION

Hereinafter, a gas turbine combustor of the present invention will be described in detail with the reference to the attached drawings.

In the gas turbine, a plurality of gas turbine combustors are annularly arranged around one axis. In order to prevent burning gas from leaking from each gas turbine combustor, a seal section is provided to cover an inner circumferential wall and an outer circumferential wall of an end section (outlet) of a tail pipe section of each of the combustors arranged annually (upper wall and lower wall in the gas turbine combustor). For this purpose, a flange is provided for each of the upper and lower walls of the end portion (outlet) of the tail pipe section of each combustor to attach the seal section.

In the gas turbine combustor of the present invention, the stiffness of the flange provided for each of the upper and lower walls of the end portion (outlet) of the tail pipe section is intentionally reduced such that the stiffness of the flange becomes substantially equal to the stiffness of a side plate of each of the side walls. Thus, compulsion deformation is suppressed which is caused due to thermal stress generated in the end portion (outlet) of the tail pipe section on the operation of the conventional gas turbine combustor, and it becomes possible to reduce high stress easy to generate in the side plate. As a result, the high fatigue resistance gas turbine combustor can be realized.

First Embodiment

Figure 1A:
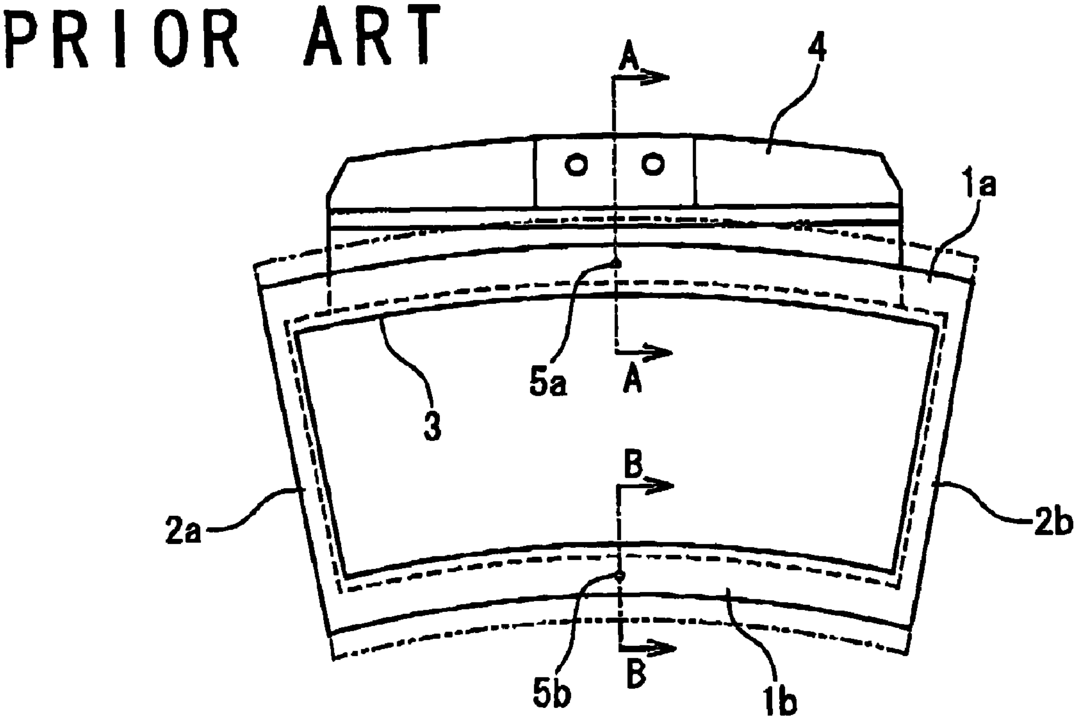
Fig. 1A PRIOR ART
FIG. 1A is a diagram schematically showing the structure of a conventional combustor tail pipe section.
Figure 1B:
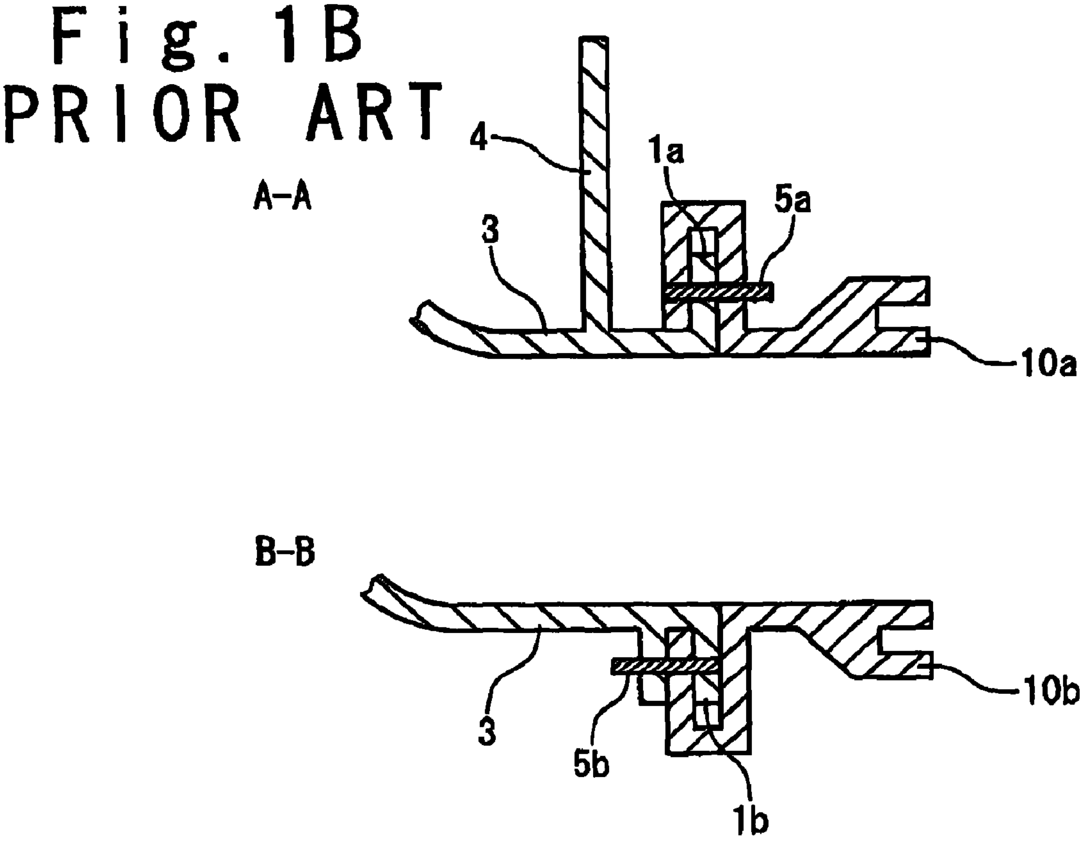
Fig. 1B PRIOR ART
FIG. 1B is sectional views showing sections of the conventional combustor tail pipe section along the line A-A and the line B-B shown in FIG. 1A.
Figure 2:
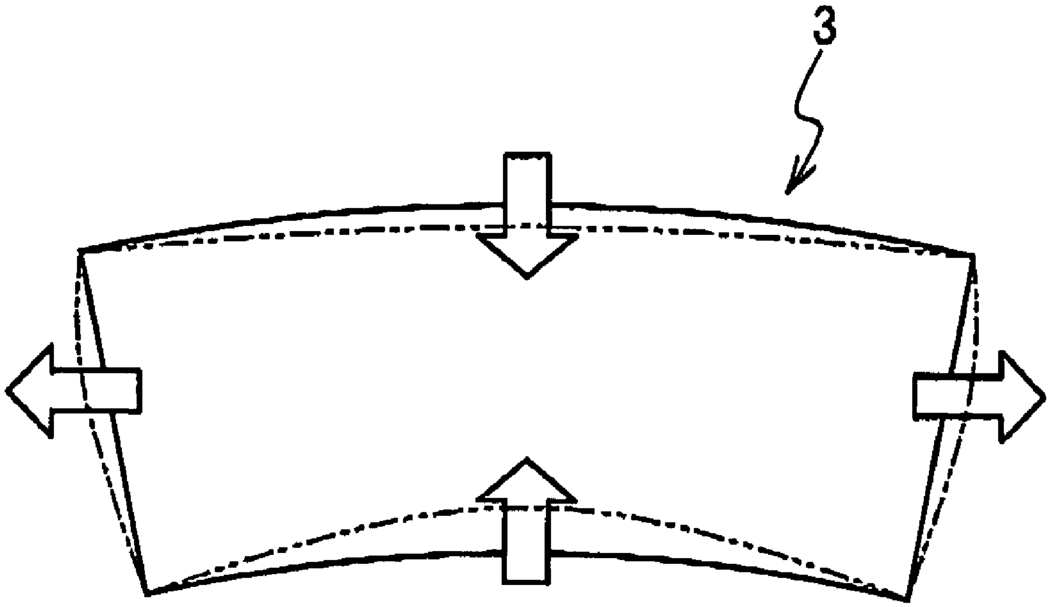
Fig. 2 PRIOR ART
FIG. 2 is a diagram showing deformation of the side, upper and lower walls of an end portion of the tail pipe section in the conventional gas turbine combustor.
Figure 3A:
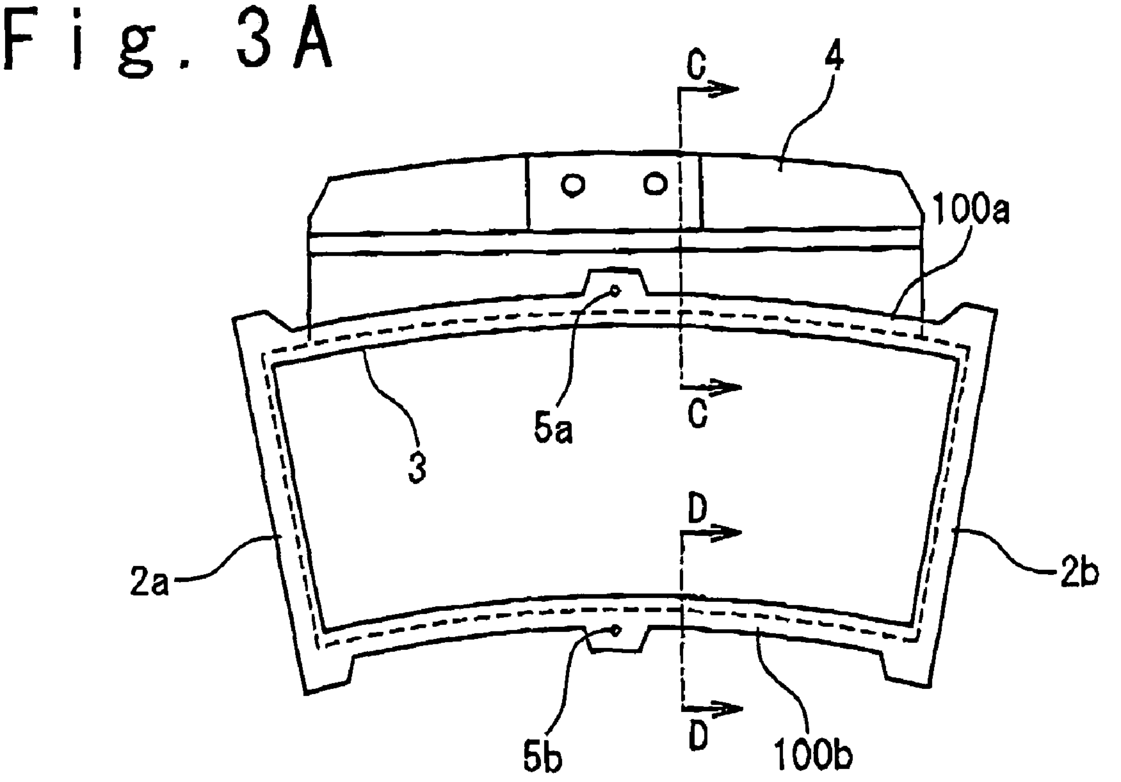
FIG. 3A is a diagram schematically showing the structure of a tail pipe section of a gas turbine combustor according to a first embodiment of the present invention when it is seen from an exhaust side in a state of no seal section.

FIG. 3A is a diagram schematically showing the structure of the tail pipe section of the gas turbine combustor according to the first embodiment of the present invention when it is seen from the exhaust side in a state of no seal section. Also, FIG. 3B is sectional views showing sections of the gas turbine combustor in the first embodiment along the line C-C and the line D-D shown in FIG. 3A.

In the gas turbine combustor of the present invention, a plurality of gas turbine combustors are annularly arranged. A seal section is provided to cover each of the upper and lower walls of the end portion (outlet) of the tail pipe section of each combustor so that the burning gas from each combustor can be sealed. For this purpose, as FIG. 3B, a plate for each of upper and lower walls of the tail pipe section of the main body 3 of the gas turbine combustor in the present embodiment is provided with an upper seal 20*a* and a lower seal 20*b* to connect the plurality of combustors annularly. The upper seal 20*a* and the lower seal 20*b* are engaged with an upper flange 100*a* and a lower flange 100*b*, respectively. Also, a gusset 4 is provided on the upper wall of the main body 3 of the combustor tail pipe section to fix the main body 3 of the tail pipe section to the housing of the gas turbine. A partition for the adjacent combustors, and side seals 2*a* and 2*b* for positioning are arranged for the side walls of the main body 3 of the combustor tail pipe section. A positioning pin 5*a* is inserted in an engaging portion of the upper flange 100*a* of the main body 3 of the combustor tail pipe section and the upper seal 20*a* to fix a relative position relation of them. In the same way, a positioning pin 5*b* is inserted in an engaging portion of the lower flange 100*b* of the main body 3 of the combustor tail pipe section and the lower seal 20*b* to fix a relative position relation of them. In this way, the seal section is connected with an end portion of the main body 3 of the combustor tail pipe section. Also, it is possible to prevent the burning gas from leaking a space between the end portion of the tail pipe section of the combustor main body 3 and the seal sections 20*a* and 20*b*.

Figure 3B:
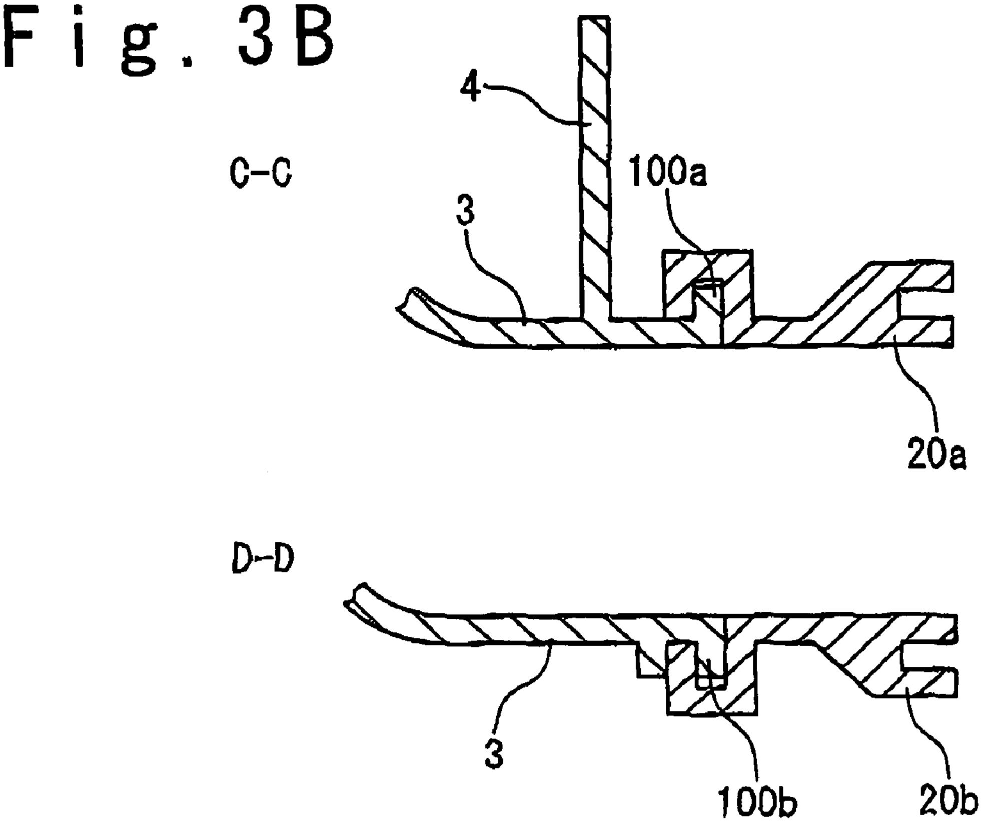
FIG. 3B is sectional views showing sections of the gas turbine combustor in the first embodiment along the line C-C and the line D-D shown in FIG. 3A.

In the present embodiment, as shown in FIG. 3B, the flanges 100*a* and 100*b* are provided in which the height is lower than the conventional flanges 1*a* and 1*b* (the thickness is made thinner). The heights of the seal sections 20*a* and 20*b* are reduced suppressed in correspondence to the heights of the flanges 100*a* and 100*b*. Also, in the present embodiment, the height of the flange is reduced to a minimum height necessary for the flange and the seal section to engage in a portion other than an engaging portion of the upper flange 100*a* and the upper seal 20*a* and an engaging portion of the lower flange 100*b* and the lower seal 20*b*, as shown in FIG. 3A.

In the gas turbine combustor according to the present embodiment, the height of each of the flanges which are provided for the upper and lower walls of the end portion (outlet) of the tail pipe section is reduced to a minimum height necessary for the flange and the seal section to engage and to carry out the positioning in a portion other than a positioning portion with the seal section. Thus, the stiffness of the flange in each of the upper and lower walls in the end portion (outlet) of the tail pipe section of the gas turbine combustor according to the present embodiment can be intentionally reduced. Thus, it is possible to reduce the stiff difference between the upper and lower walls and the side walls in the tail pipe section end section (outlet). The compulsion deformation can be reduced which is caused due to thermal stress generated in the tail pipe section end portion (outlet) on the operation of the gas turbine combustor. Also, it becomes possible to reduce the high stress easy to generate in the side plate. In the present embodiment, the gas turbine combustor having a high fatigue resistance can be realized. Thus, the gas turbine combustor with high reliability can be provided.

Second Embodiment

Figure 4A:
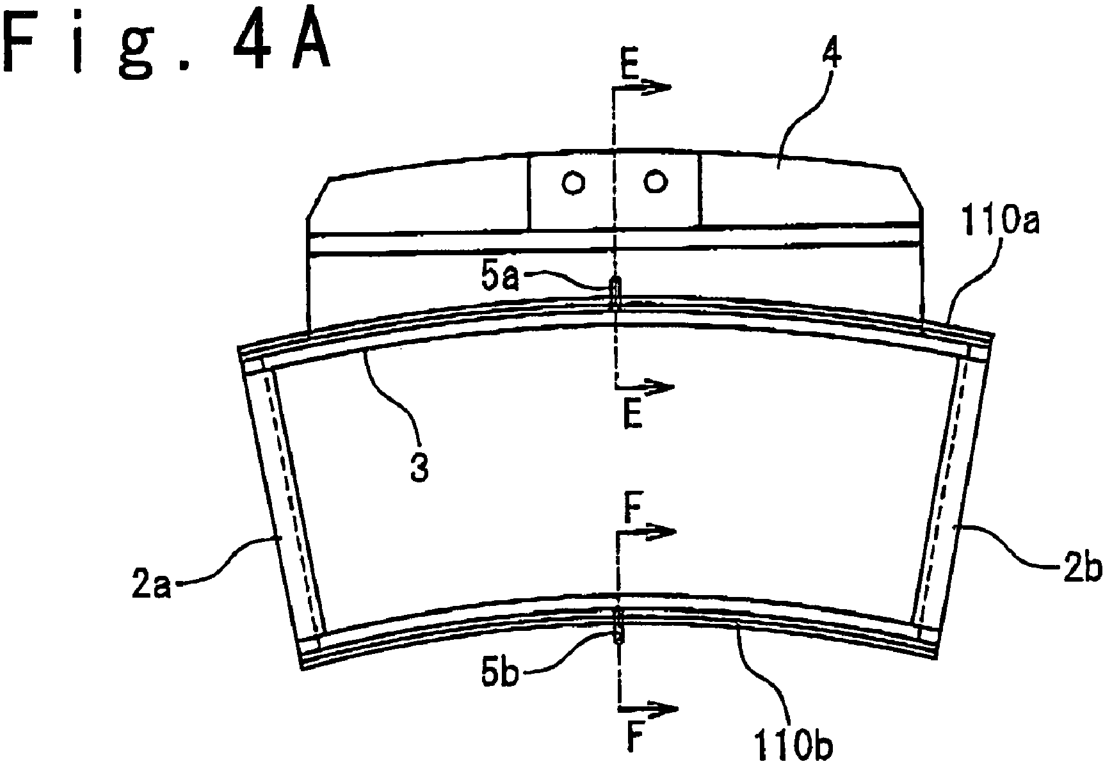
FIG. 4A is a diagram schematically showing the structure of the tail pipe section of the gas turbine combustor according to a second embodiment of the present invention when it is seen from the exhaust side in a state of no seal section.

FIG. 4A is a diagram schematically showing the structure of the tail pipe section of the gas turbine combustor according to the second embodiment of the present invention when it is seen from the exhaust side without a seal section. Also, FIG. 4B is sectional views showing sections of the tail pipe section of the gas turbine combustor of the second embodiment along the line E-E and the line F-F shown in FIG. 4A.

The basic components and structure of the gas turbine combustor of the second embodiment are the same as those of the gas turbine combustor of the first embodiment. However, in the second embodiment, the shapes of an engaging portion of an upper flange 110*a* and an upper seal 30*a* and an engaging portion of a lower flange 110*b* and a lower seal 30*b* are different from those of the first embodiment. The shapes different from the first embodiment and the effect of the shapes will be described.

Figure 4B:
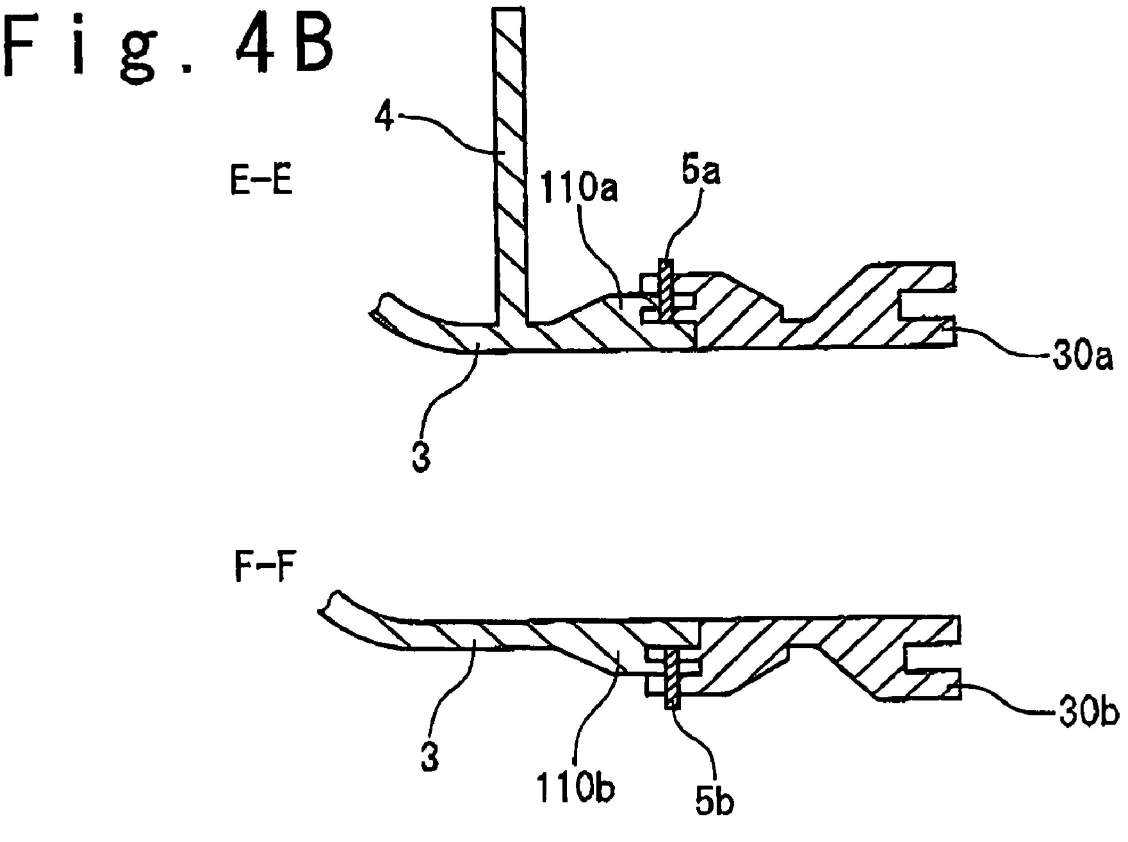
FIG. 4B is sectional views showing sections of the gas turbine combustor in the second embodiment along the line E-E and the line F-F shown in FIG. 4A.

In the second embodiment, as shown in FIG. 4B, the upper seal 30*a* is inserted into the upper flange 110*a* and engaged with it, and the lower seal 30*b* is inserted into the lower flange 110*b* and engaged with it. After the engagement, in suitable portions, positioning pins 5*a* and 5*b* are inserted in the vertical direction. The flanges 110*a* and 110*b* and the seal sections 30*a* and 30*b* are fixed by these pins, respectively. In this embodiment, the engaging portion of the upper flange 110*a* and the upper seal 30*a* and the engaging portion of the lower flange 110*b* and the lower seal 30*b* are formed through the insertion in a horizontal direction. Therefore, the heights of the upper flange 110*a* and the upper seal 30*a* and the heights of the lower flange 110*b* and the lower seal 30*b* (in a direction perpendicular to the flow direction of burning gas) can be more reduced than the first embodiment.

In the gas turbine combustor according to the present embodiment, the height of the flange provided in each of the upper and lower walls of the end portion (outlet) of the tail pipe section can be suppressed to the minimum height necessary for the flange and the seal section to engage. The stiffness of the flange in each of the upper and lower walls of the end portion (outlet) of the tail pipe section can be intentionally reduced. Thus, a stiff difference can be suppressed between the upper and lower walls of the end portion (outlet) of the tail pipe section and the side walls. As a result, the compulsion deformation caused due to the thermal stress generated in the end portion (outlet) of the tail pipe section on the operation of the gas turbine combustor, and it becomes possible to reduce the high stress easy to generate in the side plate. In the present embodiment, the gas turbine combustor with the high fatigue resistance can be realized and the reliability of the gas turbine combustor improves.

Third Embodiment

Figure 5A:
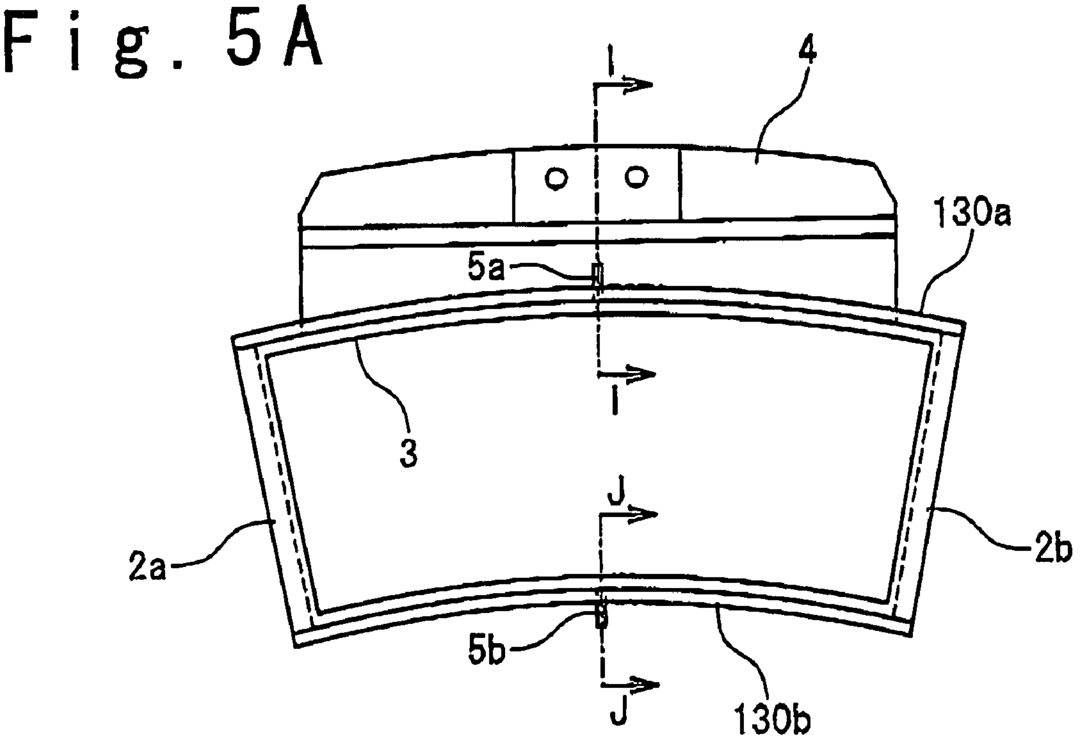
FIG. 5A is a diagram schematically showing the structure of the tail pipe section of the gas turbine combustor according to a third embodiment of the present invention when it is seen from the exhaust side in a state of no seal section.
Figure 5B:
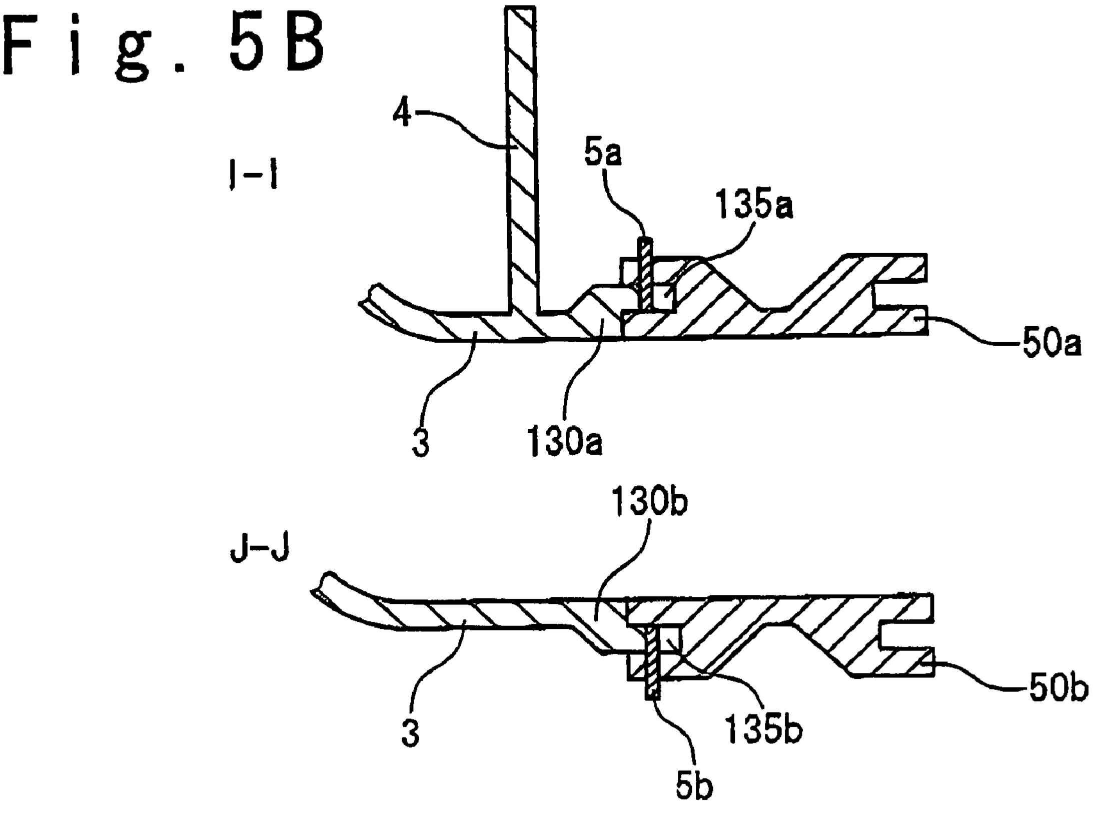
FIG. 5B is sectional views showing sections of the gas turbine combustor in the third embodiment along the line E-E and the line F-F shown in FIG. 5A.

FIG. 5A is a diagram schematically showing the structure of the tail pipe section of the gas turbine combustor according to the third embodiment of the present invention when it is seen from the exhaust side in a state of no seal section. Also, FIG. 5B is sectional views showing sections of the tail pipe section of the gas turbine combustor in the third embodiment along the line I-I and the line J-J shown in FIG. 5A. The basic components and structure of the gas turbine combustor according to the present embodiment are the same as those of the gas turbine combustor of the second embodiment. However, in the present embodiment, the height of an engaging portion of an upper flange 130*a* and an upper seal 50*a* and an engaging portion of a lower flange 130*b* and a lower seal 50*b* is reduced further lower than in the second embodiment. The shapes different from the second embodiment and the effect of the shapes below will be described.

As shown in FIG. 5B in the present embodiment, the upper seal 50*a* is inserted in the upper flange 130*a* and the lower seal 50*b* is inserted into the lower flange 130*b* in the horizontal direction and they are engaged.

In the present embodiment, the upper flange 130*a* is not provided with a comb-shaped gap in the horizontal direction. A convex section 135*a* is engaged with a concave section of the upper seal 50*a* to connect the upper flange 130*a* and the upper seal 50*a*. In the same manner, in the connection of the lower flange 130*b* and the lower seal 50*b*, the convex section 135*b* is engaged with the concave section of the lower seal 50*b* in the horizontal direction so that the lower flange 130*b* and the lower seal 50*b* are connected. After the engagement, positioning pins 5*a* and 5*b* are inserted in the vertical direction, respectively. Thus, the flanges 130*a* and 130*b*, and the seal sections 50*a* and 50*b* are fixed, respectively. In the present embodiment, the heights (thickness) of the upper flange 130*a* and the upper seal 50*a*, and the heights of the lower flange 130*b* and the lower seal 50*b* (in a direction perpendicular to the flow direction of the burning gas) can be more reduced based on the shape of the engaging portion of the upper flange 130*a* and the upper seal 50*a*, and the shape of the engaging portion of the lower flange 130*b* and the lower seal 50*b*, compared with the second embodiment.

In the gas turbine combustor according to the present embodiment, the stiffness of the flange in each of the upper and lower walls of the end portion (outlet) of the tail pipe section can be intentionally reduced through the reduction of the height of the flange provided in each of the upper and lower walls of the end portion (outlet) of the tail pipe section. Thus, the stiffness difference can be reduced between the upper and lower walls of the end portion (outlet) of the tail pipe section and the side walls. Also, compulsion deformation can be suppressed which is caused due to the thermal stress generated in the end portion (outlet) of the tail pipe section on the operation of the gas turbine combustor. Also, it becomes possible to reduce the high stress easy to generate in the side plate. In the present embodiment, the gas turbine combustor with the high fatigue resistance can be realized and the reliability of the gas turbine combustor improves.

Fourth Embodiment

Figure 6A:
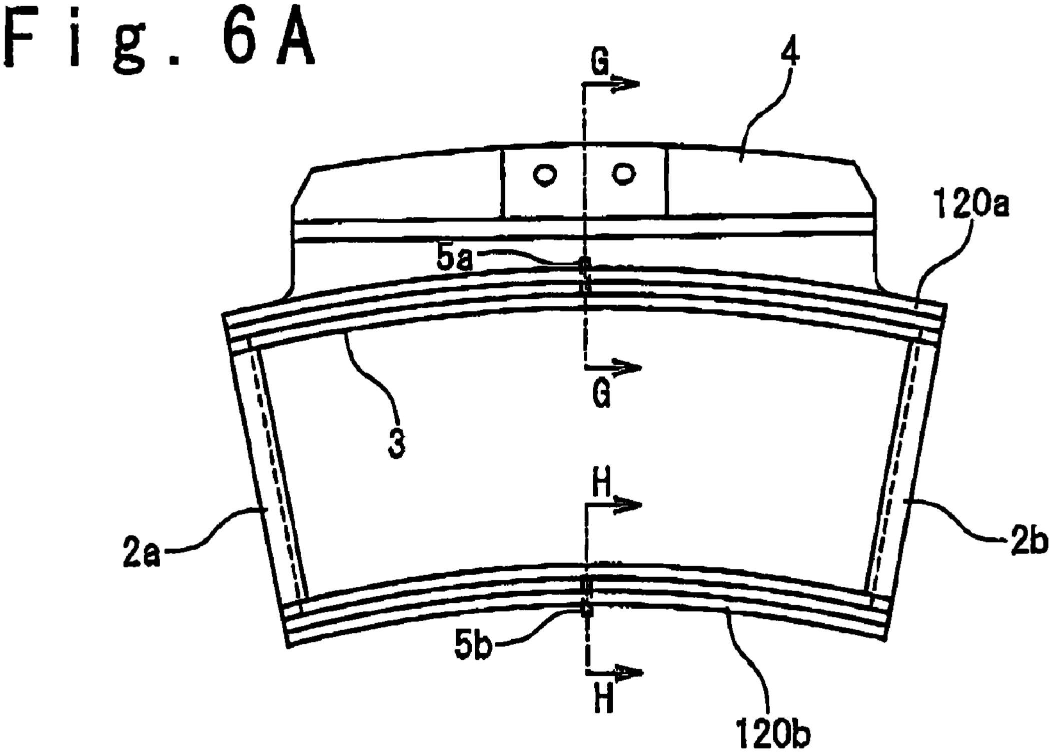
FIG. 6A is a diagram schematically showing the structure of the tail pipe section of the gas turbine combustor according to a fourth embodiment of the present invention when it is seen from the exhaust side in a state of no seal section.

FIG. 6A is a diagram schematically showing the structure of the tail pipe section of the gas turbine combustor according to the fourth embodiment of the present invention when it is seen from the exhaust side in a state of no seal section. Also, FIG. 6B is sectional views showing sections of the tail pipe section of the gas turbine combustor in the fourth embodiment along the line G-G and the line H-H shown in FIG. 6A.

The basic structure of the gas turbine combustor according to the present embodiment is the same as that of the gas turbine combustor according to the first embodiment. However, in the present embodiment, the gas turbine combustor according to the present embodiment is not provided with the upper flange and the lower flange. An upper seal supporting section 120*a* is provided in a gusset 4 to support the upper seal 40*a* to be inserted to the end portion (outlet) of the tail pipe section. A lower seal supporting section 120*b* is provided on the surface opposite to the position it which the gusset 4 is provided to insert the lower seal 40*b*.

Figure 6B:
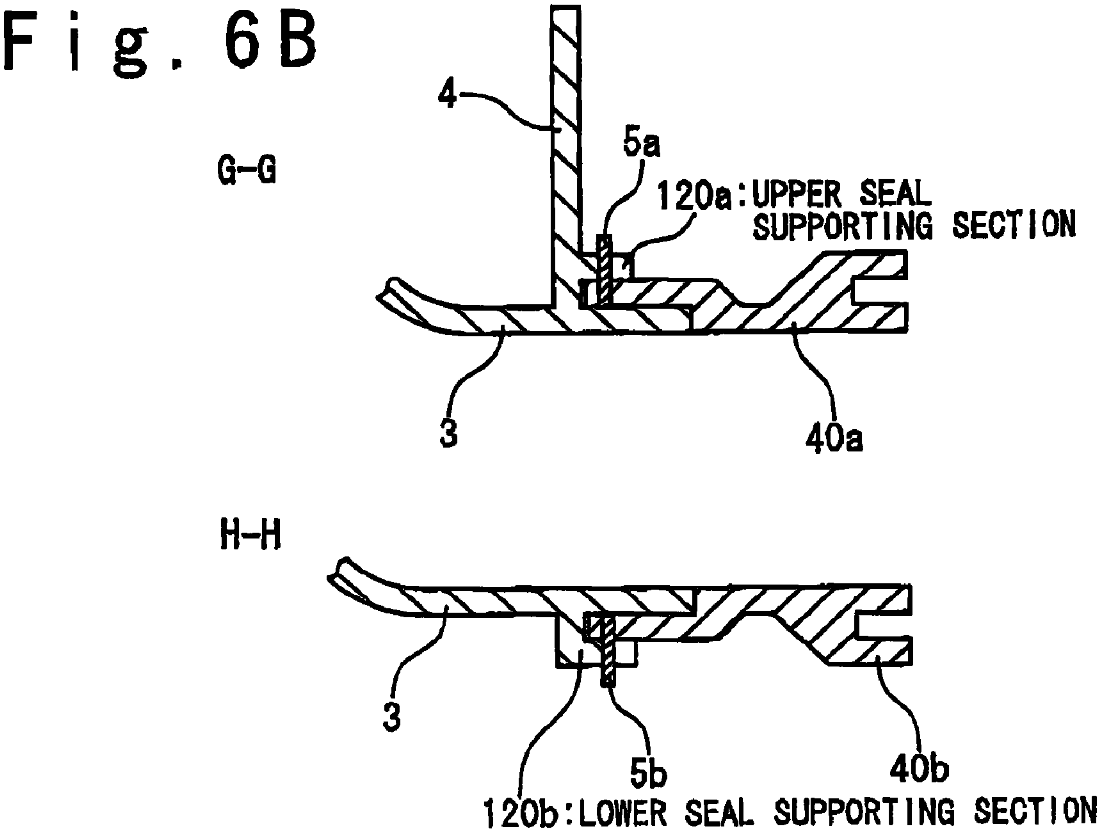
FIG. 6B is sectional views showing sections of the gas turbine combustor in the fourth embodiment along the line G-G and the line H-H shown in FIG. 6A.

In the present embodiment, as shown in FIG. 6B, the upper seal 40*a* is inserted below the upper seal supporting section 120*a* in the horizontal direction and engaged with it, and the lower seal 40*b* is inserted below the lower seal supporting section 120*b* in the horizontal direction and engaged with it. After the engagement, positioning pins 5*a* and 5*b* are inserted in the vertical direction in suitable portions to fix the supporting sections 120*a* and 120*b* and the seal sections 40*a* and 40*b*, respectively.

In the present embodiment, since the seal sections are connected with the main body 3 of the tail pipe section without any flanges on the upper and lower walls of the end portion (outlet) of the tail pipe section, the stiffness difference between the upper and lower walls of the end portion (outlet) of the tail pipe section and the side walls can be greatly reduced. Thus, the compulsion deformation can be suppressed which is caused due to the thermal stress generated in the end portion (outlet) of the tail pipe section on the operation of the gas turbine combustor. Also, it becomes possible to reduce the high stress easy to generate in the side plate. In the present embodiment, the gas turbine combustor with the high fatigue resistance can be realized and the reliability of the gas turbine combustor improves.

Fifth Embodiment

Figure 7A:
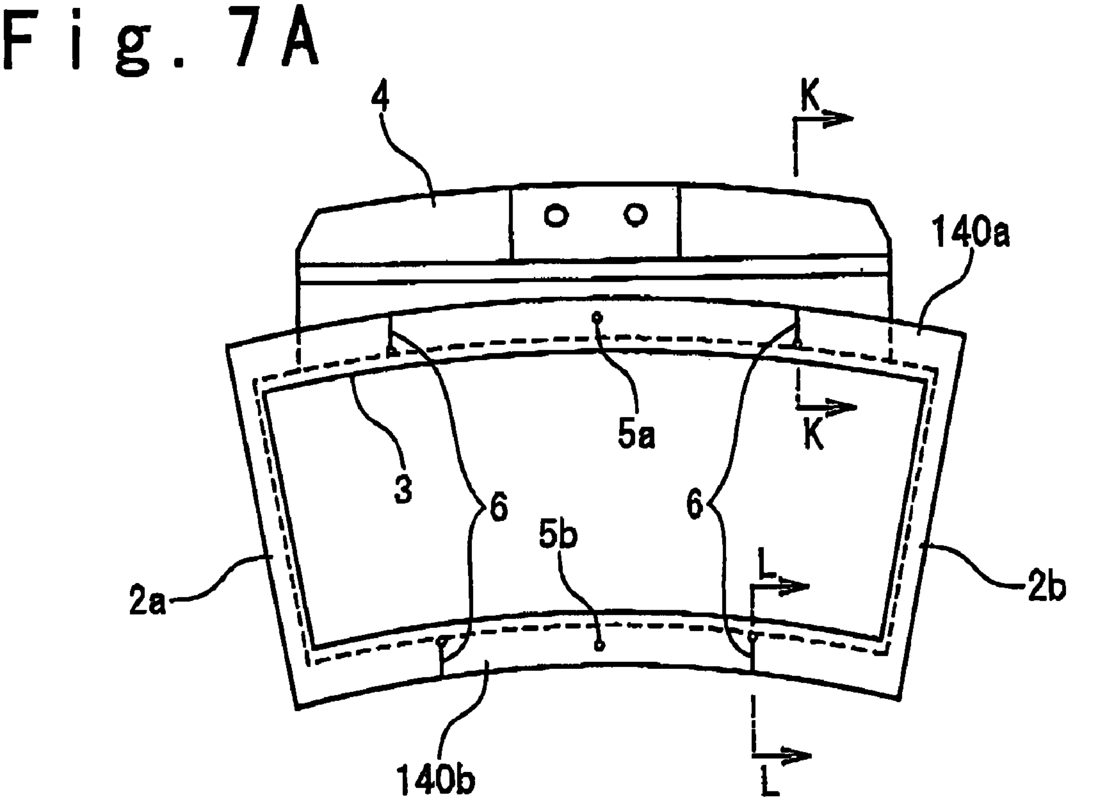
FIG. 7A is a diagram schematically showing the structure of the tail pipe section of the gas turbine combustor according to a fifth embodiment of the present invention when it is seen from the exhaust side in a state of no seal section.

FIG. 7A is a diagram schematically showing the structure of the tail pipe section of the gas turbine combustor according to the fifth embodiment of the present invention when it is seen from the exhaust side in a state no seal section. Also, FIG. 7B is sectional views showing sections of the tail pipe section of the gas turbine combustor of this fifth embodiment along the line K-K and the line L-L shown in FIG. 7A.

The basic components and structure of the gas turbine combustor in the fifth embodiment are the same as those of the gas turbine combustor of the first embodiment. However, in the present embodiment, slits 6 are provided on optional positions of an upper flange 140*a* and a lower flange 140*b* to reduce the stiffness of the flange appropriately. The shapes of components different from those of the first embodiment and the effect of the shapes will be described below.

Figure 7B:
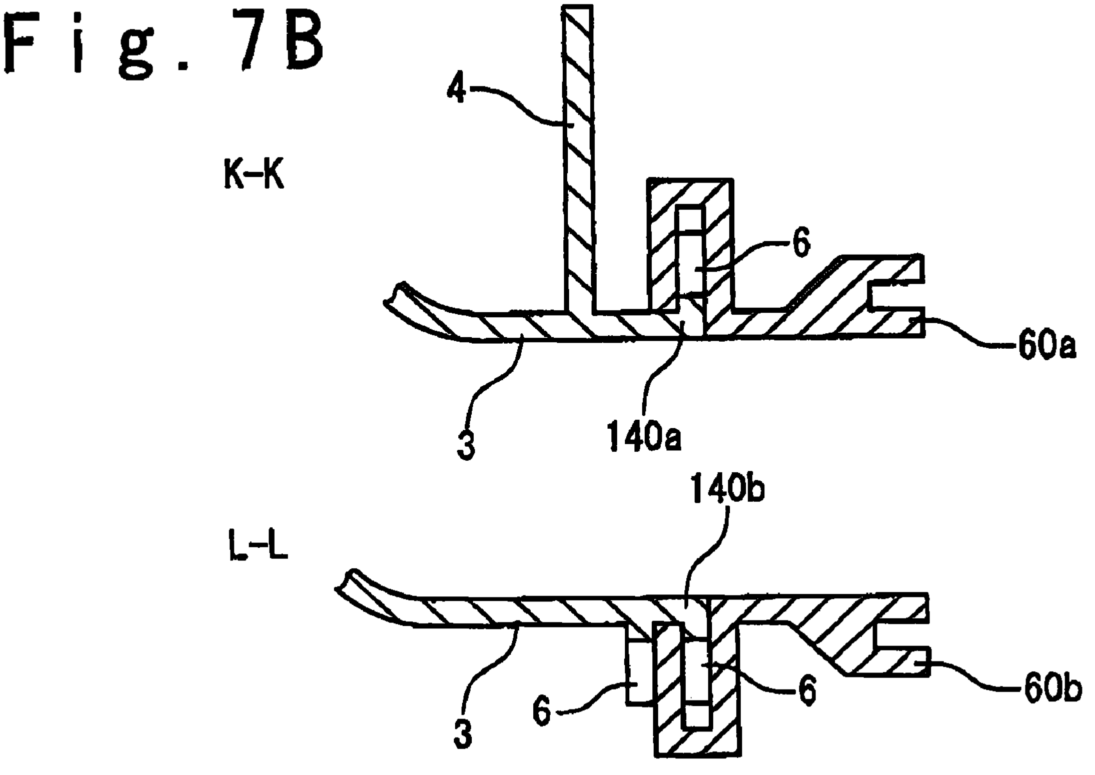
FIG. 7B is sectional views showing sections of the gas turbine combustor in the fifth embodiment along the line K-K and the line L-L shown in FIG. 7A.

In the present embodiment, as shown in FIG. 7B, an upper seal 60*a* is inserted into the upper flange 140*a* in the horizontal direction and engaged with it, ad a lower seal 60*b* is inserted in the lower flange 140*b* in the horizontal direction and engaged with it. After the engagement, positioning pins 5*a* and 5*b* are inserted in suitable positions, to fix the seal sections 60*a* and 60*b* and the flanges 140*a* and 140*b*, respectively. In the present embodiment, the slits 6 are provided for the upper flange 140*a* and the lower flange 140*b* in the vertical direction. The stiffness of each of the flanges 140*a* and 140*b* can be reduced by this slit 6. As a result, a warp of the side wall can be reduced which is caused due to the thermal stress generated due to the stiff difference between the upper and lower walls of the end portion (outlet) of the tail pipe section and the side walls on the operation of the gas turbine combustor of the present embodiment.

In the gas turbine combustor according to the present embodiment, the stiffness of the flange in each of the upper and lower walls of the end portion (outlet) of the tail pipe section can be intentionally reduced by the slit 6 provided for the flange in each of the upper and lower walls of the end portion (outlet) of the tail pipe section. Thus, the stiff difference can be reduced between the upper and lower walls of the end portion (outlet) of the tail pipe section and the side walls. Also, the compulsion deformation can be reduced which is caused due to the thermal stress generated in the end portion (outlet) of the tail pipe section on the operation of the gas turbine combustor. Also, it becomes possible to reduce the high stress easy to generate in the side plate. In the present embodiment, the gas turbine combustor with the high fatigue resistance can be realized and the reliability of the gas turbine combustor improves.

Sixth Embodiment

Figure 8A:
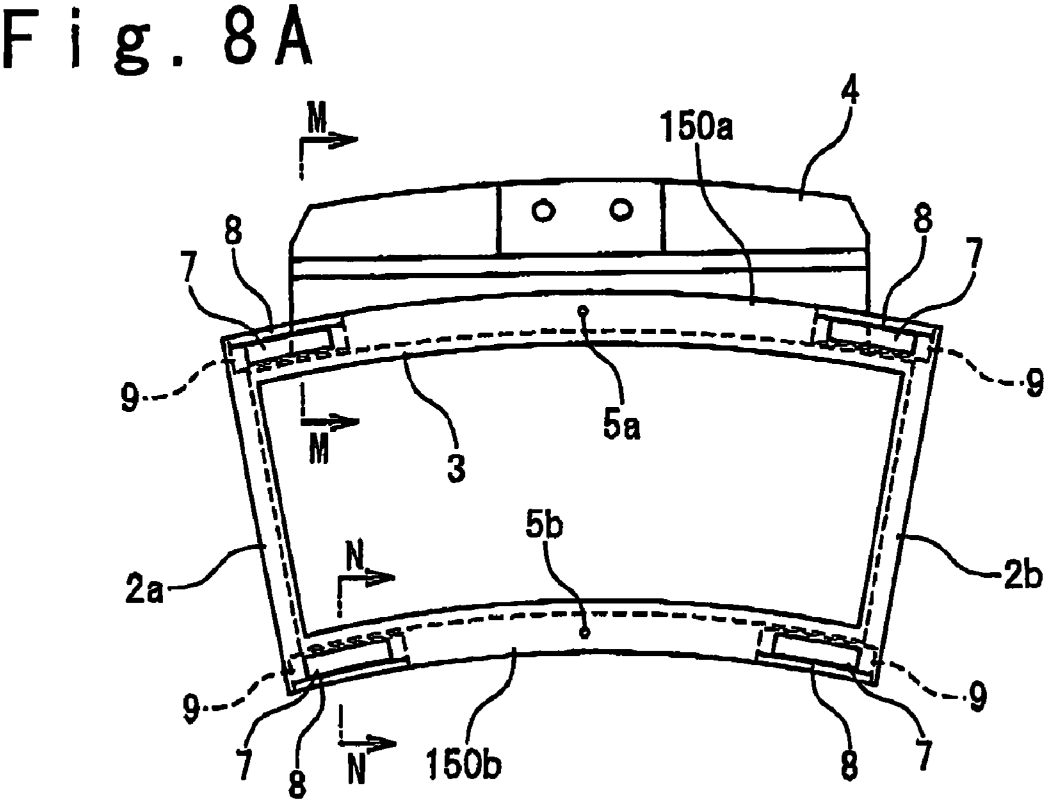
FIG. 8A is a diagram schematically showing the structure of the tail pipe section of the gas turbine combustor according to a sixth embodiment of the present invention when it is seen from the exhaust side in a state of no seal section.

FIG. 8A is a diagram schematically showing the structure of the tail pipe section of the gas turbine combustor according to the sixth embodiment of the present invention when it is seen from the exhaust side in a state of no seal section. Also, FIG. 8B is sectional views showing sections of the tail pipe section of the gas turbine combustor in the sixth embodiment along the line M-M and the line N-N in FIG. 8A.

The basic components and structure of the gas turbine combustor according to the present embodiment are the same as those of the gas turbine combustor of the first embodiment. However, in the present embodiment, openings 7 of appropriate sizes are provided in optional positions of the upper flange 150*a* and the lower flange 150*b*. When the upper flange 150*a* and the seal section are engaged and the lower flange 150*b* and the seal section are engaged, a shield plate 9 is provided on a back position of the opening 7 for the purpose to prevent cooling air flowing through the tail pipe main body 3 from leaking through the opening 7. The shield plate 9 is welded along the periphery of the opening 7 in the upper flange 150*a* or the lower flange 150*b*.

Figure 8B:
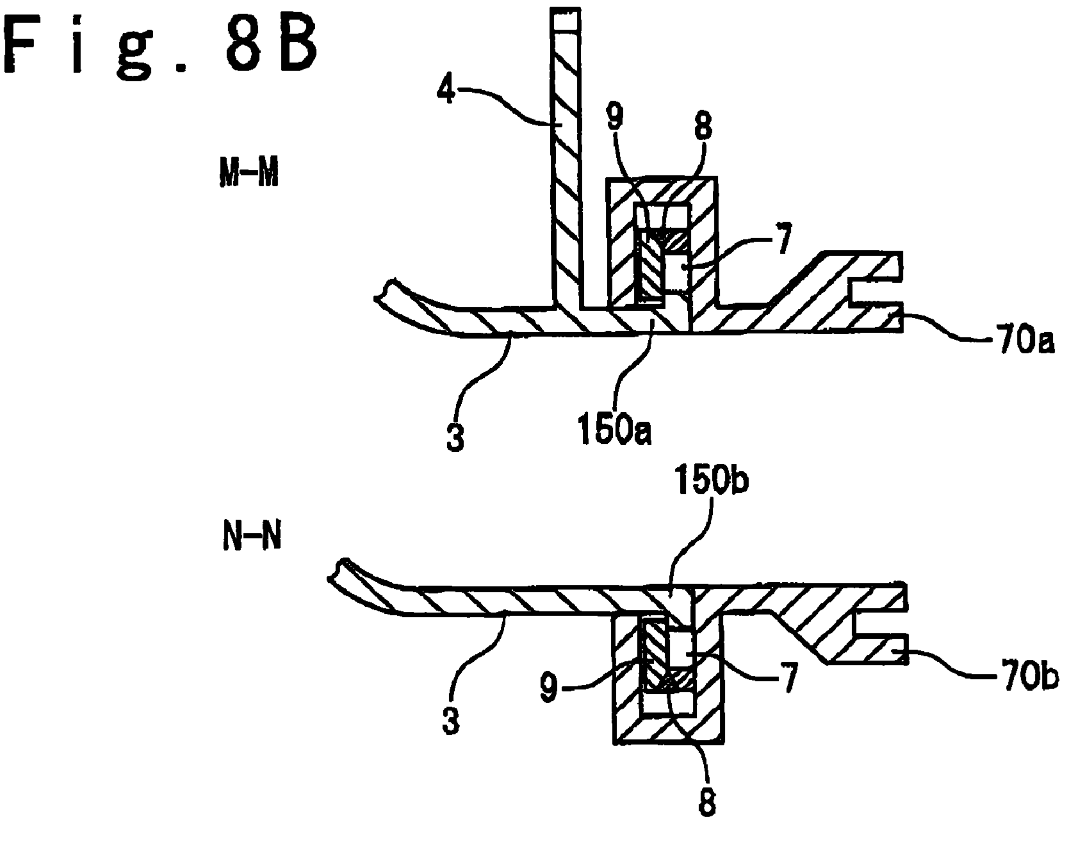
FIG. 8B is sectional views showing sections of the gas turbine combustor in the sixth embodiment along the line M-M and the line N-N shown in FIG. 8A.

In the present embodiment, as shown in FIG. 8B, the upper seal 70*a* is put on the upper flange 150*a* in the vertical direction and engaged with it, and the lower seal 70*b* is put on the lower flange 150*b* in the vertical direction and engaged with it. After the engagement, positioning pins 5*a* and 5*b* are inserted in suitable positions in the horizontal direction to fix the flanges 150*a* and 150*b*, and the seal sections 70*a* and 70*b*, respectively. In the present embodiment, the openings 7 are provided for the upper flange 150*a* and the lower flange 150*b*. The stiffness of each of the flanges 150*a* and 150*b* formed in the upper and lower walls of the end portion (outlet) of the tail pipe section can be reduced with this opening 7. Also, a warp of the side wall can be reduced which is caused due to the thermal stress generated due to the stiff difference between the upper and lower walls of the end portion (outlet) of the tail pipe section and the side walls on the operation of the gas turbine combustor of the present embodiment.

In the present embodiment, since the shield plate 9 is provided on the back of the opening 7, it is possible to prevent cooling air flowing through the main body 3 of the tail pipe section from leaking from the opening 7, and the improvement of the reliability is attained at a same time.

In the gas turbine combustor according to the present embodiment, the stiffness of the flange in each of the upper and lower walls of the end portion (outlet) of the tail pipe section can be intentionally reduced with the opening 7 provided for each of the upper and lower walls of the end portion (outlet) of the tail pipe section. Thus, the stiff difference can be reduced between the upper and lower walls of the end portion (outlet) of the tail pipe section and the side wall. Also, the compulsion deformation can be reduced which is caused due to the thermal stress generated in the end portion (outlet) of the tail pipe section on the operation of the gas turbine combustor. The high stress easy to generate in the side plate can be reduced. In the present embodiment, the gas turbine combustor with the high fatigue resistance can be realized and the reliability of the gas turbine combustor can be improved.

Seventh Embodiment

Figure 9A:
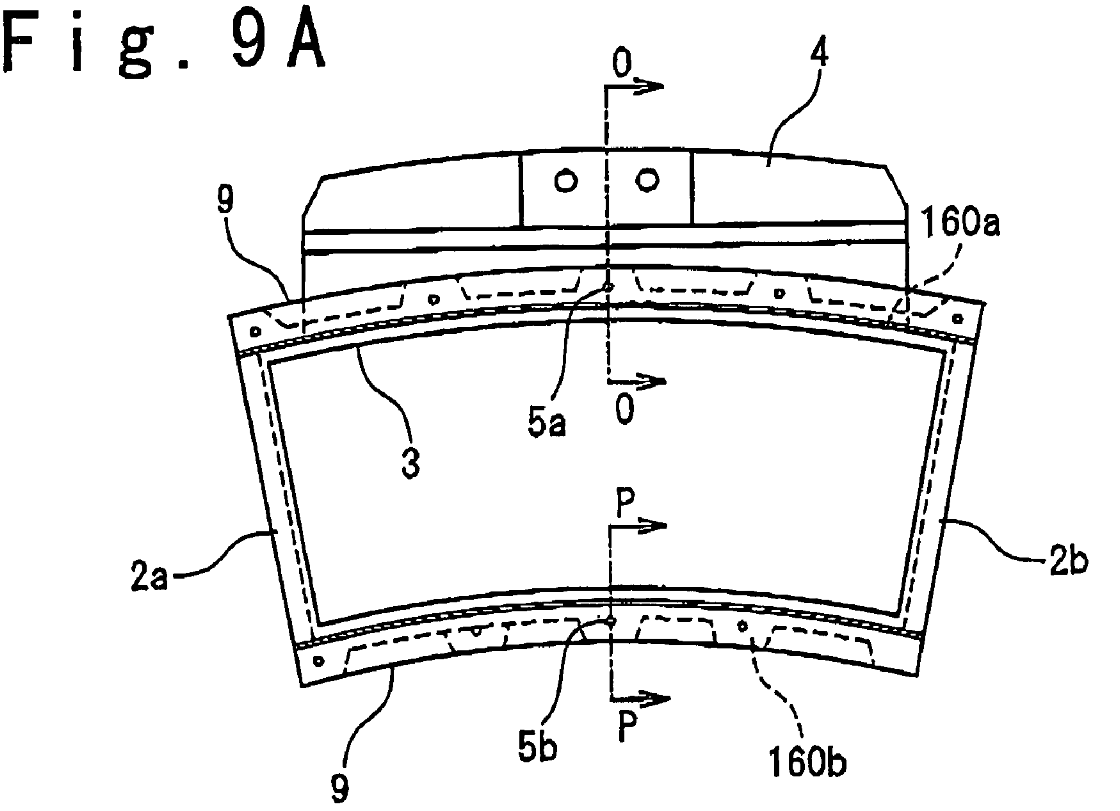
FIG. 9A is a diagram schematically showing the structure of the tail pipe section of the gas turbine combustor according to a seventh embodiment of the present invention when it is seen from the exhaust side in a state of no seal section.

FIG. 9A is a diagram schematically showing the structure of the tail pipe section of the gas turbine combustor according to the seventh embodiment of the present invention when it is seen from the exhaust side in a state of no seal section. Also, FIG. 9B is sectional views showing sections of the tail pipe section of the gas turbine combustor in the seventh embodiment along the line O-O and the line P-P shown in FIG. 9A.

The basic components and structure of the gas turbine combustor of the seventh embodiment are the same as those of the gas turbine combustor of the first embodiment. However, in the present embodiment, when the flanges 160*a* and 160*b* and the seal sections 80*a* and 80*b* are engaged, respectively, a shield plate 9 for seal is provided along each of the upper flange 160*a* and the lower flange 160*b*, for the purpose to prevent the burning gas from leaking from a flow path. Also, the upper flange 160*a* and the lower flange 160*b* and the shield plate 9 are fixed by positioning pins 55, respectively.

Figure 9B:
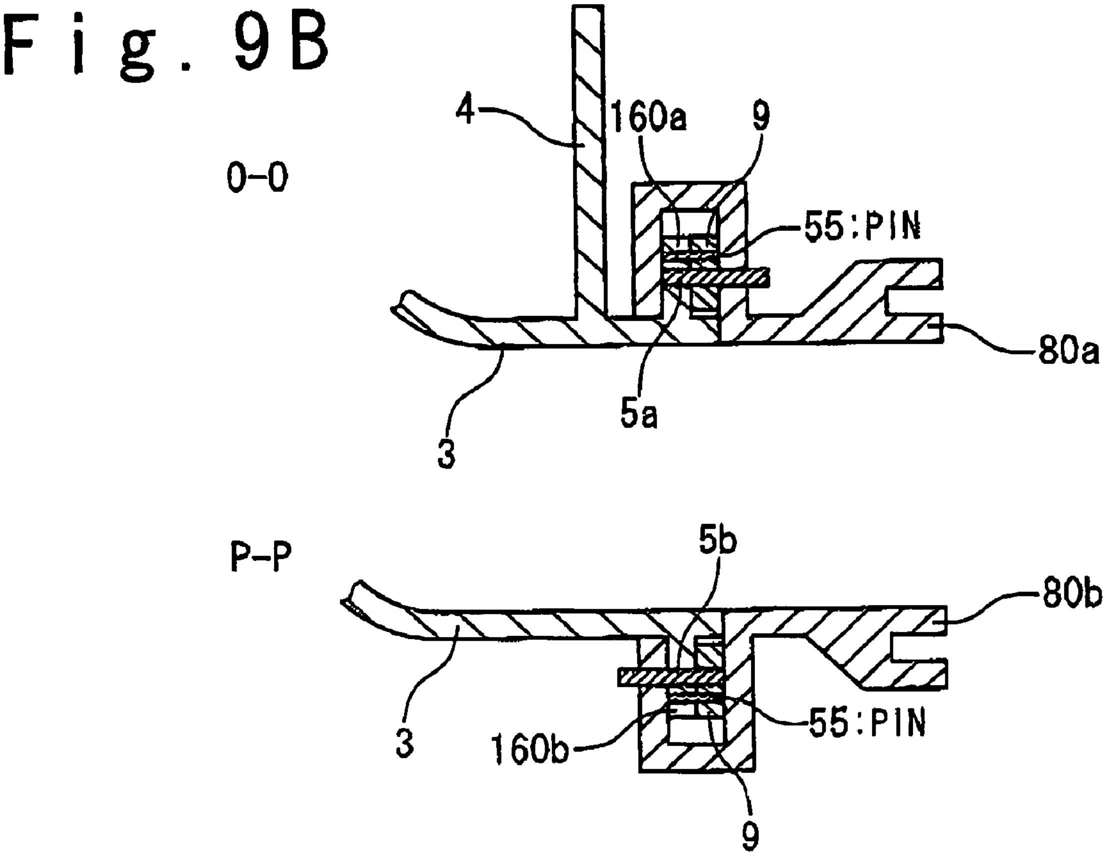
FIG. 9B is sectional views showing sections of the gas turbine combustor in the seventh embodiment along the line O-O and the line P-P shown in FIG. 9A.

In the present embodiment, as shown in FIG. 9B, the upper seal 80*a* is pushed to the upper flange 160*a* in the vertical direction and engaged with it, and the lower seal 80*b* is pushed to the lower flange 160*b* in the vertical direction and engaged with it. After the engagement, the positioning pins 5*a* and 5*b* are inserted in suitable positions, to fix the flanges 160*a* and 160*b*, and the seal sections 80*a* and 80*b*.

In the present embodiment, like the first embodiment, the heights (the length in the perpendicular direction to the flow direction of the burning gas) of the upper flange 160*a* and the lower flange 160*b* are set low. Thus, the stiffness of the upper and lower walls of the end portion (outlet) of the tail pipe section can be reduced. Also, a warp of the side wall can be reduced which is caused due to the thermal stress generated due to the stiffness difference between the upper and lower walls of the end portion (outlet) of the tail pipe section and the side wall on the operation of the gas turbine combustor of the present embodiment.

Moreover, in the present embodiment, the shield plate 9 is arranged along each of the flanges 160*a* and 160*b*. Therefore, it is possible to prevent the burning gas from leaking from gaps between the flanges 160*a* and 160*b*, and the seal sections 80*a* and 80*b*, and the improvement of the reliability is attained at a same time. In the present embodiment, the gas turbine combustor with the high fatigue resistance can be realized and the reliability of the gas turbine combustor improves.

Eighth Embodiment

Figure 10A:
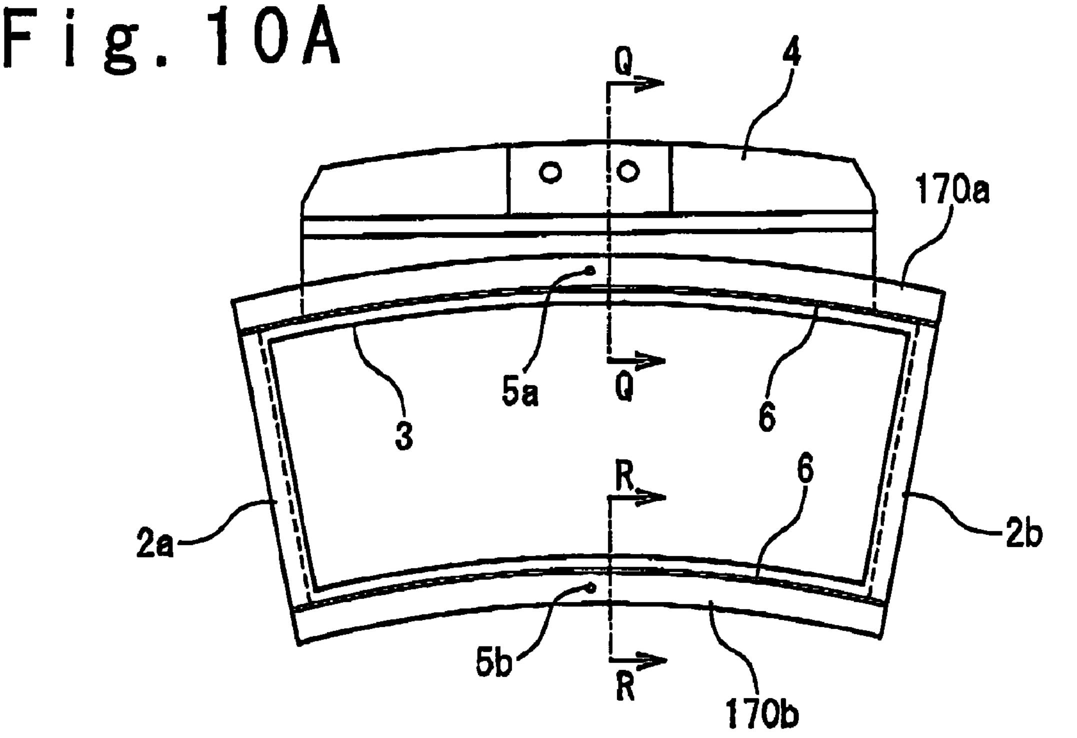
FIG. 10A is a diagram schematically showing the structure of the tail pipe section of the gas turbine combustor according to an eighth embodiment of the present invention when it is seen from the exhaust side in a state of no seal section.
Figure 10B:
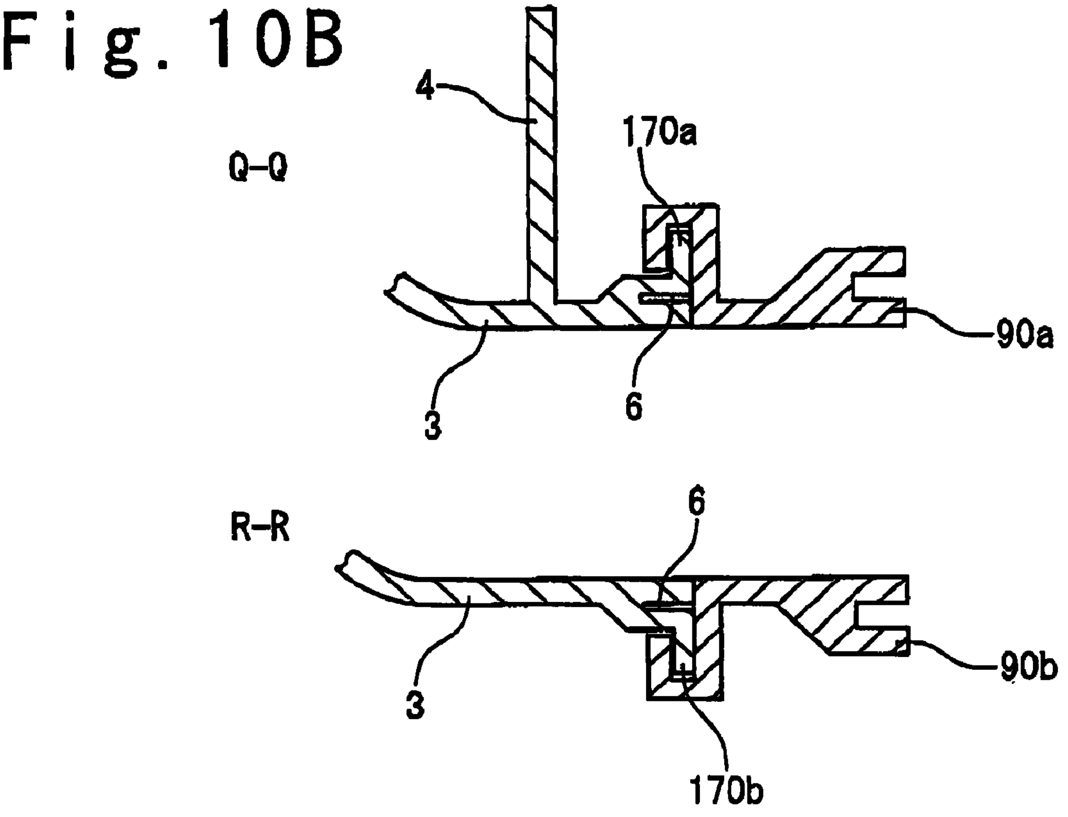
FIG. 10B is sectional views showing sections of the gas turbine combustor in the eighth embodiment along the line Q-Q and the line R-R shown in FIG. 10A.

FIG. 10A is a diagram schematically showing the structure of the tail pipe section of the gas turbine combustor according to the eighth embodiment of the present invention when it is seen from the exhaust side in a state of no seal section. Also, FIG. 10B is sectional views showing sections of the tail pipe section of the gas turbine combustor in the eighth embodiment along the line Q-Q and the line R-R shown in FIG. 10A.

The basic components and structure of the gas turbine combustor according to the present embodiment are the same as those of the gas turbine combustor of the first embodiment. However, the rear ends of the upper flange 170*a* and lower flange 170*b* of the present embodiment are provided with the slits 6 extending in the horizontal direction, respectively. In the present embodiment, the upper flange 170*a* and the lower flange 170*b* are engaged with the upper seal 90*a* and the lower seal 90*b*, respectively. Then, by inserting positioning pins 5*a* and 5*b* into suitable positions in the horizontal direction, the flanges 170*a* and 170*b*, and the seal sections 90*a* and 90*b* are fixed, respectively.

In the present embodiment, the slits extending in the horizontal direction (the flow direction of burning gas) are provided in the rear ends of the upper flange 170*a* and lower flange 170*b*. Thus, thermal expansion deformation caused in the upper and lower walls of the end portion (outlet) of the tail pipe section on the operation of the gas turbine combustor operation is absorbed by the slit 6 and is cancelled by this. Thereby, the stiffness of the flange in each of the upper and lower walls of the end portion (outlet) of the tail pipe section is reduced. Also, a warp of the side wall can be reduced which is caused due to the thermal stress generated due to the stiff difference between the upper and lower walls of the end portion (outlet) of the tail pipe section and the side wall on the operation of the gas turbine combustor of the present embodiment. In the present embodiment, the gas turbine combustor with the high fatigue resistance can be realized and the reliability of the gas turbine combustor improves.

According to the present invention, by reducing the stiffness of the flange provided for the upper and lower walls of the end portion (outlet) of the tail pipe section in the gas turbine combustor intentionally, it is possible to reduces the compulsion deformation of the side plates of the tail pipe section, and it is possible to reduce high stress generated in the side plate. Thus, the gas turbine combustor can be provided in which the fatigue resistance of the combustor is improved.

The invention claimed is:

1. A gas turbine combustor comprising:
a combustor main body;
a tail pipe connected with said combustor main body to spout out burning gas; and
a seal section provided to prevent said burning gas from leaking from a space of a plurality of said tail pipes annularly arranged around one axis, and wherein:
said tail pipe has upper and lower walls opposite to each other in a radius direction of said axis in an end portion of said tail pipe, and a first stiffness reducing engaging portion provided for said upper and lower walls for reducing the stiffness of said upper and lower walls,
said seal section has a second engaging portion for engagement with said first stiffness reducing engaging portion in a front end of said seal section,
said first stiffness reducing engaging portion comprises one set of flanges opposite to each other in the radius direction, and further comprising:
a shield plate provided along each of said flanges of the one set,
wherein said shield plate and said flange are fixed by a shield plate fixing member, and
said tail pipe and said seal section are connected, by engaging each of said flanges of the one set in which said shield plate is provided, with said second engaging portion.

2. A gas turbine combustor comprising:
a combustor main body;
a tail pipe connected with said combustor main body to spout out burning gas; and
a seal section provided to prevent said burning gas from leaking from a space of a plurality of said tail pipes annularly arranged around one axis, wherein:
said tail pipe has upper and lower walls opposite to each other in a radius direction of said axis in an end portion of said tail pipe, and a first stiffness reducing engaging portion provided for said upper and lower walls for reducing the stiffness of said upper and lower walls, and
said seal section has a second engaging portion for engagement with said first stiffness reducing engaging portion in a front end of said seal section,
said first stiffness reducing engaging portion comprises one set of flanges provided to oppose each other in said radius direction and to extend in a flow direction of said burning gas, and
each of said flanges and said second engaging portion are engaged with each other in the flow direction of said burning gas,
each of said flanges has a convex section, and
said second engaging portion has a concave section which is engaged with said convex section to connect said tail pipe and said seal section.

3. A gas turbine combustor comprising:
a combustor main body;
a tail pipe connected with said combustor main body to spout out burning gas; and
a seal section provided to prevent said burning gas from leaking from a space of a plurality of said tail pipes annularly arranged around one axis, wherein:
said tail pipe has upper and lower walls opposite to each other in a radius direction of said axis in an end portion of said tail pipe, and a first stiffness reducing engaging portion provided for said upper and lower walls for reducing the stiffness of said upper and lower walls, and
said seal section has a second engaging portion for engagement with said first stiffness reducing engaging portion in a front end of said seal section,
said tail pipe further comprising:
a gusset provided on a position apart from the end portion of said tail pipe to extend in a perpendicular direction to a pipe surface of said tail pipe and to fix said tail pipe to a housing of the gas turbine, said gusset has a first supporting section to engage said second engaging portion, said tail pipe has a second supporting section provided on the pipe surface of said tail pipe opposite to said gusset to engage said second engaging portion, and said tail pipe and said seal section are connected by engaging said first and second supporting sections as first engaging portion and said second engaging portion.

4. A gas turbine combustor comprising:

a combustor main body;

a tail pipe connected with said combustor main body to spout out burning gas; and a seal section provided to prevent said burning as from leaking from a space of a plurality of said tail annularly arranged around one axis, wherein:

said tail pipe has upper and lower walls opposite to each other in a radius direction of said axis in an end portion of said tail pipe, and a first stiffness reducing engaging portion provided for said upper and lower walls for reducing the stiffness of said upper and lower walls, and said seal section has a second engaging portion for engagement with said first stiffness reducing engaging portion in a front end of said seal section, said first stiffness reducing engaging portion comprising:

one set of said flanges opposite each other in the radius direction, and wherein each of said flanges has an opening.

5. The gas turbine combustor according to claim 4, wherein:

a seal plate is provided along an external circumference of said opening, said external circumference and said seal plate are welded, and said tail pipe and said seal section are connected by engaging said one set of said flanges and said seal plate connected to said set and said second engaging portion.

6. A gas turbine combustor comprising:

a combustor main body;

a tail pipe connected with said combustor main body to spout out burning gas; and a seal section provided to prevent said burning gas from leaking from a space of a plurality of said tail pipes annularly arranged around one axis, and wherein:

said tail pipe has upper and lower walls opposite to each other in a radius direction of said axis in an end portion of said tail pipe, and a first stiffness reducing engaging portion provided for said upper and lower walls for reducing the stiffness of said upper and lower walls, said seal section has a second engaging portion for engagement with said first stiffness reducing engaging portion in a front end of said seal section, said first stiffness reducing engaging portion comprising one set of flanges opposite to each other in the circumferential direction, and each of said flanges has a slit extending in a direction perpendicular to the flow direction of said burning gas.

7. A gas turbine combustor comprising:

a combustor main body;

a tail pipe connected with said combustor main body to spout out burning gas; and a seal section provided to prevent said burning gas from leaking from a space of a plurality of said tail pipes annularly arranged around one axis, and wherein:

said tail pipe has upper and lower walls opposite to each other in a radius direction of said axis in an end portion of said tail pipe, and a first stiffness reducing engaging portion provided for said upper and lower walls for reducing the stiffness of said upper and lower walls, said seal section has a second engaging portion for engagement with said first stiffness reducing engaging portion in a front end of said seal section, said first stiffness reducing engaging portion comprising one set of flanges opposite to each other in the circumferential direction, and each of said flanges has a slit extending in the flow direction of said burning gas.

* * * * *